United States Patent [19]

Wolfe et al.

[11] Patent Number: 4,462,817
[45] Date of Patent: Jul. 31, 1984

[54] METHOD OF PREPARING SILICON NITRIDE ARTICLES FOR SINTERING

[75] Inventors: Robert W. Wolfe, Wysox; Joseph J. Cleveland, Towanda, both of Pa.

[73] Assignee: GTE Products Corporation, Stamford, Conn.

[21] Appl. No.: 502,381

[22] Filed: Jun. 8, 1983

[51] Int. Cl.³ .................... C03C 25/02; C04B 35/56
[52] U.S. Cl. ............................................ 65/36; 65/42; 65/56; 65/60.8; 264/62; 264/332; 264/109; 427/300; 427/376.2
[58] Field of Search .................. 65/17, 18.1, 36, 42, 65/56, 60.8, 23, 112; 427/300, 369, 370, 376.2; 264/62, 332, 351

[56] References Cited

U.S. PATENT DOCUMENTS

| | | |
|---|---|---|
| 2,856,377 | 3/1959 | Retzer et al. ................. 65/42 X |
| 3,097,959 | 7/1963 | Zachman ...................... 427/300 X |
| 3,875,277 | 4/1975 | Bratton et al. ................ 264/332 X |
| 4,112,143 | 9/1978 | Adlerborn et al. ............ 427/191 |
| 4,215,088 | 7/1980 | Ardary ........................ 264/332 |
| 4,242,294 | 12/1980 | Huther et al. ................ 264/62 |
| 4,256,688 | 3/1981 | Adlerborn et al. ............ 264/332 X |
| 4,351,858 | 9/1982 | Hunold et al. ................ 427/193 |

FOREIGN PATENT DOCUMENTS 1522705  8/1978  United Kingdom.

Primary Examiner—Robert L. Lindsay, Jr.
Attorney, Agent, or Firm—James Theodosopoulos

[57] ABSTRACT

In the manufacture of sintered silicon nitride articles by hot isostatic pressing, silicon nitride preforms are assembled in a stack with spacers between the preforms. The stack is completely enveloped in refractory metal foil and then encapsulated within a single capsule for the pressing operation.

4 Claims, 5 Drawing Figures

METHOD OF PREPARING SILICON NITRIDE ARTICLES FOR SINTERING

This invention is concerned with the manufacture of sintered silicon nitride articles by means of hot isostatic pressing, such as is shown in U.S. Pat. Nos. 4,351,858, 4,256,688, 4,112,143 and British Pat. No. 1,522,705. The patents disclose (1) the pressing of silicon nitride powder into a preform, (2) encapsulating the preform in a material that is impermeable to the pressure medium (usually a gas) that is used in the hot isostatic pressing operation and which is plastic at the hot isostatic pressing conditions, and (3) hot isostatic pressing the encapsulated preform. The patents disclose hot isostatic pressing of only a single part at a time. This invention is concerned with the hot isostatic pressing of more than one part at a time, for reasons of economy of production.

In this invention, two or more preforms are stacked together and are then encapsulated within a single capsule to be hot isostatically pressed. In order to prevent the preforms from diffusion-bonding to each other during hot isostatic pressing, suitable refractory spacers are placed therebetween. The spacers must be inert with respect to the silicon nitride preforms and must have a melting point greater than the hot isostatic pressing temperature. If the spacer material, for example, alumina, is insufficiently inert with respect to the silicon nitride preforms, the alumina spacer may be coated with boron nitride to provide the desired inertness. The stack of preforms is then completely enveloped or wrapped in a suitable refractory metal foil prior to encapsulating the stack in a capsule, the reason being to prevent any loose particles of powder that may be present on the stack from interfering with the formation of a sealed capsule.

Figure 1:
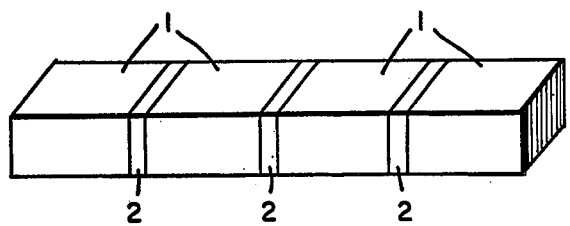
FIG. 1 shows a stack of preforms separated by spacers.
Figure 2:
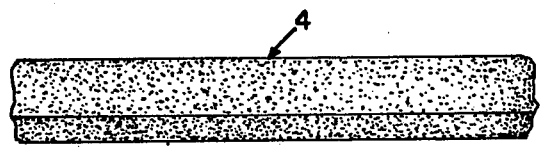
FIG. 2 shows the stack wrapped in refractory metal foil.
Figure 3:
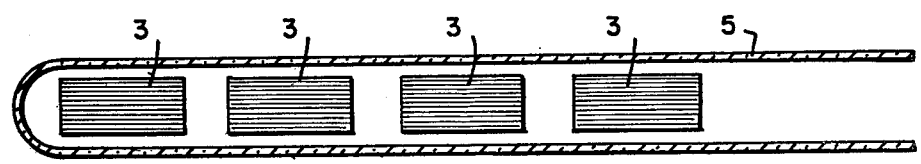
FIG. 3 shows several spaced-apart wrapped stacks within an open-ended glass tube.
Figure 4:
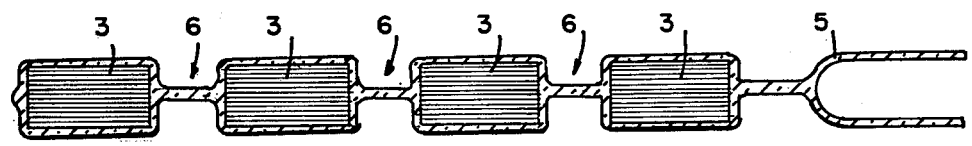
FIG. 4 shows the glass completely collapsed around each stack.
Figure 5:
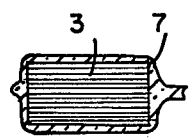
FIG. 5 shows an encapsulated stack cut apart from the others and ready for hot isostatic pressing.

In one example of this invention, cutting tool blanks, or preforms 1, were pressed from silicon nitride powder having an average particle size of about one micron and containing about 6% of an organic binder, for example, stearic acid and/or carbowax, in a die at a pressure of about 50000 psi. Preforms 1 were ½ inch square by 3/16 inch thick. The purpose of the binder was to give the preforms serviceable green strength. Spacers 2 were then pressed in the same die at about the same pressure from boron nitride powder having an average particle size of about one micron and containing about 10% of the same binder. Spacers 2 were ½ inch square by 50 mils thick. Preforms 1 and spacers 2 were then heated at 550° C. for 2 hours to drive off the binders. Stack 3 was then formed by assembling six preforms 1 with spacers 2 separating the preforms from each other, as shown in FIG. 1. In order to give stack 3 adequate strength for handling, a boron nitride coating was applied between each preform 1 and spacer 2 and was applied over the outside of stack 3. The boron nitride coating was applied from a suspension of fine boron nitride particles in an aqueous binder solution. Stack 3 was then heated at 550° C. for 72 hours to drive off the water and binders and to thoroughly dry the stack. The height of stack 3 was about 1½ inches. Stack 3 was then wrapped in a 2½ inch by 5 inch sheet of ½ mil molybdenum foil 4 so that all six surfaces of stack 3 were covered. Stack 3 was then inserted into horizontal glass tube 5 which was sealed at one end. The inside diameter of glass tube 5 was about 2 mm greater than the largest cross sectional dimension of stack 3; the length of glass tube 5 was 36 inches. Glass tube 5 was made of a glass of high silica content such as Vycor. Ten foil wrapped stacks 3 were inserted into glass tube 5 leaving a space of about 1½ inches between stacks 3. Glass tube 5 was then carefully inserted into a furnace in a horizontal position, in order to maintain the 1½ inch spacing between stacks 3, and was heated to the softening point of the glass, about 1400° C., while a vacuum of about 500 microns was drawn on the open end of glass tube 5. After the glass collapsed around each stack 3, as shown in FIg. 4, the collapsed tube was removed from the furnace and cooled. After cooling, the collapsed tube was cut through at spaces 6 between stacks 3 with a diamond saw, leaving each stack 3 enclosed in a sealed glass capsule 7, as shown in FIG. 5. Each capsule 7 was then hot isostaticly pressed, as shown in the above mentioned patents, in an argon atmosphere at a maximum temperature of 1800° to 1900° C. and a maximum pressure of about 20,000 psi. After cooling, capsule 7 was removed by breaking it, metal foil 4 was removed from around stack 3, and cutting tool blanks 1 were easily separated from each other because of spacers 2 inbetween.

The silicon nitride may contain sintering-promoting additives such as magnesia as disclosed in the above mentioned patents, or other property modifiers, for example, titanium carbide to modify hardness or alumina to modify thermal conductivity.

Other refractory materials that may be used for spacer 2 are alumina, spinel and magnesia, zirconia and rare earth oxides, for example, lanthana, yttrium and ceria. In the event that such materials are insufficiently inert with respect to silicon nitride, the boron nitride coating thereon will prevent direct contact with the silicon nitride preform and thereby prevent reaction therebetween.

If desired, only one stack 3 need be encapsulated at a time. In such a case, glass tube 5 could be shorter than when multiple stacks are encapsulated in one glass tube.

Other refractory metal foils that could be used are tantalum or, if sufficiently ductile, tungsten. However the melting point of the metal foil should be above the isostatic pressing temperature.

We claim:

1. In the process of making a sintered silicon nitride article by pressing a preform from silicon nitride powder and then isostatically pressing the preform at high temperature and high pressure to make the sintered silicon nitride article, the improvement which comprises the steps of assembling a plurality of such preforms in a stack with spacers separating the preforms from each other, completely enveloping the stack in refractory metal foil, enclosing the foil enveloped stack in a sealed glass capsule, hot isostatically pressing the glass capsule, removing the glass from around the stack, and then separating the sintered silicon nitride articles from each other.

2. The process of claim 1 wherein the metal foil has a melting point above the isostatic pressing temperature.

3. The process of claim 2 wherein the metal foil is made of molybdenum.

4. The process of claim 1 wherein the stack is covered with a coating of boron nitride, the coating being applied prior to enveloping the stack in metal foil.

* * * * *